(12) United States Patent
Haartsen et al.

(10) Patent No.: US 8,565,257 B2
(45) Date of Patent: *Oct. 22, 2013

(54) METHOD FOR MAPPING QUALITY OF SERVICE REQUIREMENTS TO RADIO PROTOCOL PARAMETERS

(75) Inventors: Jacobus Haartsen, Hardenberg (NL); Rakesh Taori, Eindhoven (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 378 days.

This patent is subject to a terminal disclaimer.

(21) Appl. No.: 12/847,517

(22) Filed: Jul. 30, 2010

(65) Prior Publication Data

US 2010/0284273 A1 Nov. 11, 2010

Related U.S. Application Data

(63) Continuation of application No. 10/211,019, filed on Aug. 1, 2001, now Pat. No. 7,801,169.

(51) Int. Cl.
*H04J 3/02* (2006.01)
(52) U.S. Cl.
USPC .......................................... 370/462; 370/347
(58) Field of Classification Search
USPC ......... 370/230, 235–236, 336, 346–347, 431, 370/447, 455, 458, 461–462, 466–467; 455/450, 509; 709/104, 208, 226, 229, 709/236
See application file for complete search history.

(56) References Cited

U.S. PATENT DOCUMENTS

| | | | | |
|---|---|---|---|---|
| 5,602,836 A | * | 2/1997 | Papadopoulos et al. | 370/280 |
| 6,131,012 A | * | 10/2000 | Struhsaker et al. | 455/3.05 |
| 6,640,248 B1 | * | 10/2003 | Jorgensen | 709/226 |
| 6,879,561 B1 | * | 4/2005 | Zhang et al. | 370/235 |
| 6,891,799 B1 | * | 5/2005 | Hagai et al. | 370/235 |
| 7,006,472 B1 | * | 2/2006 | Immonen et al. | 370/332 |
| 7,177,658 B2 | * | 2/2007 | Willenegger et al. | 455/522 |
| 7,620,021 B1 | * | 11/2009 | Chen et al. | 370/337 |
| 7,748,002 B1 | * | 6/2010 | Beser | 718/102 |
| 7,801,169 B2 | * | 9/2010 | Haartsen et al. | 370/462 |

FOREIGN PATENT DOCUMENTS

| | | |
|---|---|---|
| EP | 1 113 628 A2 | 7/2004 |
| WO | WO 01/05098 A1 | 1/2001 |

OTHER PUBLICATIONS

Mikkonen, J. and Turunen, M., "An integrated QoS Architecture for GSM Networks," Universal Personal Communications, 1998, ICUPC '98. *IEEE J998 International Conference on* Florence, Italy, Oct. 5-9, 1998, New York. NY, pp. 403-407.
*ETSI TS 23 107 v3.4.0* (Oct. 2000), "Universal Mobile Telecommunications System (UMTS); QoS Concept and Architecture (3GPP TS 23.107 version 3.4.0 Release 1999)," Oct. 1, 2000, pp. 0-37.

* cited by examiner

*Primary Examiner* — Kevin Mew

(57) ABSTRACT

An apparatus and method for transmitting packets having quality of service requirement wherein the quality of service requirements associated with the packets are received at an input, said quality of service parameters include at least one of delay, bandwidth, peak bandwidth and retransmission bandwidth. The received quality of service parameters are mapped to radio protocol parameters including at least one of a priority slot interval, a priority slot phase, a packet duration and modulation format for the radio channel. The packets are transmitted on a radio channel according to the mapped radio protocol parameters.

34 Claims, 6 Drawing Sheets

METHOD FOR MAPPING QUALITY OF SERVICE REQUIREMENTS TO RADIO PROTOCOL PARAMETERS

This application is a continuation application which claims the benefit of U.S. patent application Ser. No. 10/211,019 filed on Aug. 1, 2001 now U.S. Pat. No. 7,801,169, the disclosure of which is fully incorporated herein by reference.

RELATED APPLICATION(S)

This application claims priority from and incorporates herein by reference the entire, disclosure of U.S. Provisional Application Ser. No. 60/313,329 filed Aug. 17, 2001.

TECHNICAL FIELD

The present invention relates to quality of service within ad hoc radio channels of a data communications system, and more particularly, to a method for mapping quality of service parameters to a set of radio parameters suitable for use with a token based multiple access radio control protocol for a time-slotted channel.

BACKGROUND OF THE INVENTION

In the last decade, progress in radio and VLSI technology has fostered the widespread use of radio communications in consumer applications. Portable devices such as mobile radios, PDAs, pagers, and mobile computers can now be produced having acceptable cost, size and power consumption. Radio communication systems for personal usage differ from radio systems like the public mobile phone network because they operate in an uncoordinated environment. These radio communications systems require an unlicensed band enabling personal devices to work anywhere in the world with a suitable system capacity. One radio band meeting this requirement is the ISM (Industrial, Scientific and Medical) band at 2.4 GHz, which is globally available. The band provides 83.5 MHz of radio spectrum. One example of a short range radio technology particularly suited for personal applications within the ISM band is the Bluetooth wireless technology. Bluetooth provides an air interface designed for operation in the ISM band and lends itself to providing low cost, low power implementations for radio. Using the Bluetooth wireless technology, personal devices may be connected in an ad hoc fashion.

As technologies like Bluetooth become widely deployed, the possibility of different types/classes of applications running from different devices attempting to share the same radio channel becomes highly likely. The passing of unrelated traffic through a shared channel is likely to have a heavy influence on each traffic stream's delay, jitter and packet loss. Some types of traffic, for example, TCP connections carrying e-mail, tolerate latency better than they tolerate packet loss. However, other types of traffic, for example, streaming video or audio, prefer shorter delays over "no loss". To enable co-existence of these seemingly different types of services, the radio protocols are expected to offer reasonable QoS guarantees. Thus, there is a need for a multi-service environment wherein traditional bursty traffic such as file transfers, e-mails or web browsing may share the same radio channel as traffic with more rigorous latency, jitter and/or packet loss requirements, such as voice. Thus, there is a need for a method for mapping the general QoS parameters provided by an application into a set of radio-specific elements.

SUMMARY OF THE INVENTION

The present invention overcomes the foregoing and other problems with an apparatus and method for transmitting packets having quality of service requirements. The quality of service parameters associated with the packets to be transmitted include at least one of delay, bandwidth, peak bandwidth and retransmission bandwidth are received at an input. The quality of service parameters are mapped to radio protocol parameters of the radio channel. The radio protocol parameters include at least one of a priority slot interval, a priority slot phase, a packet duration and a modulation format. The packets are transmitted on the radio channel according to the mapped radio protocol parameters.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Merging of internet and mobile applications has made it possible for the user of mobile/portable devices to access both internet and telecom resources. The provision of the end-to-end service may be conveyed over several networks and realized by the interaction of the protocol layers involved. To provide end-to-end QoS, all the interacting protocol layers must be QoS enabled. With the emergence of short range wireless technologies like Bluetooth, the last link can increasingly be expected to be radio based. Accordingly, QoS support must also be provided here.

Figure 1:
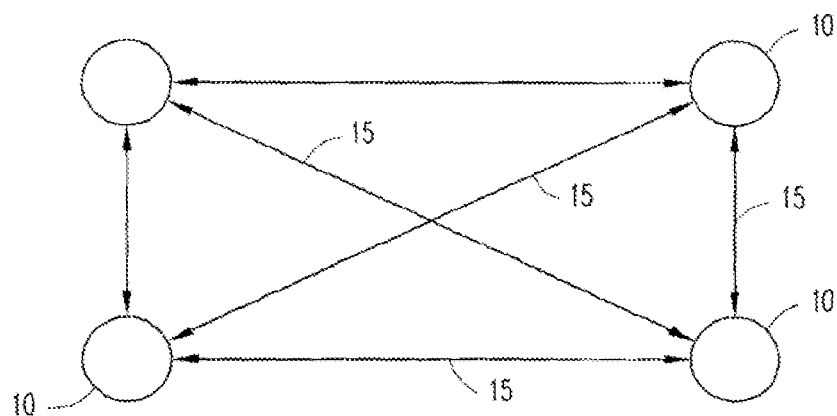
FIG. 1 illustrates an ad hoc network between a plurality of personal devices communicating via one or more radio channels.

Referring now to the drawings, and more particular to FIG. 1, there is illustrated an ad hoc network 5. A plurality of personal devices 10 may communicate via a wireless link 15 using, for example, the Bluetooth wireless protocol. The Bluetooth wireless protocol will enable the personal devices 10 to communicate via the wireless links 15 in the ISM band. The wireless connections 15 will have various quality of service (QoS) requirements required by applications being executed by the personal device 10. The applications may be time critical or non time critical. Time critical applications must transmit data within a specific time period. Non time critical applications do not require data to be transmitted within any particular time period.

Figure 2:
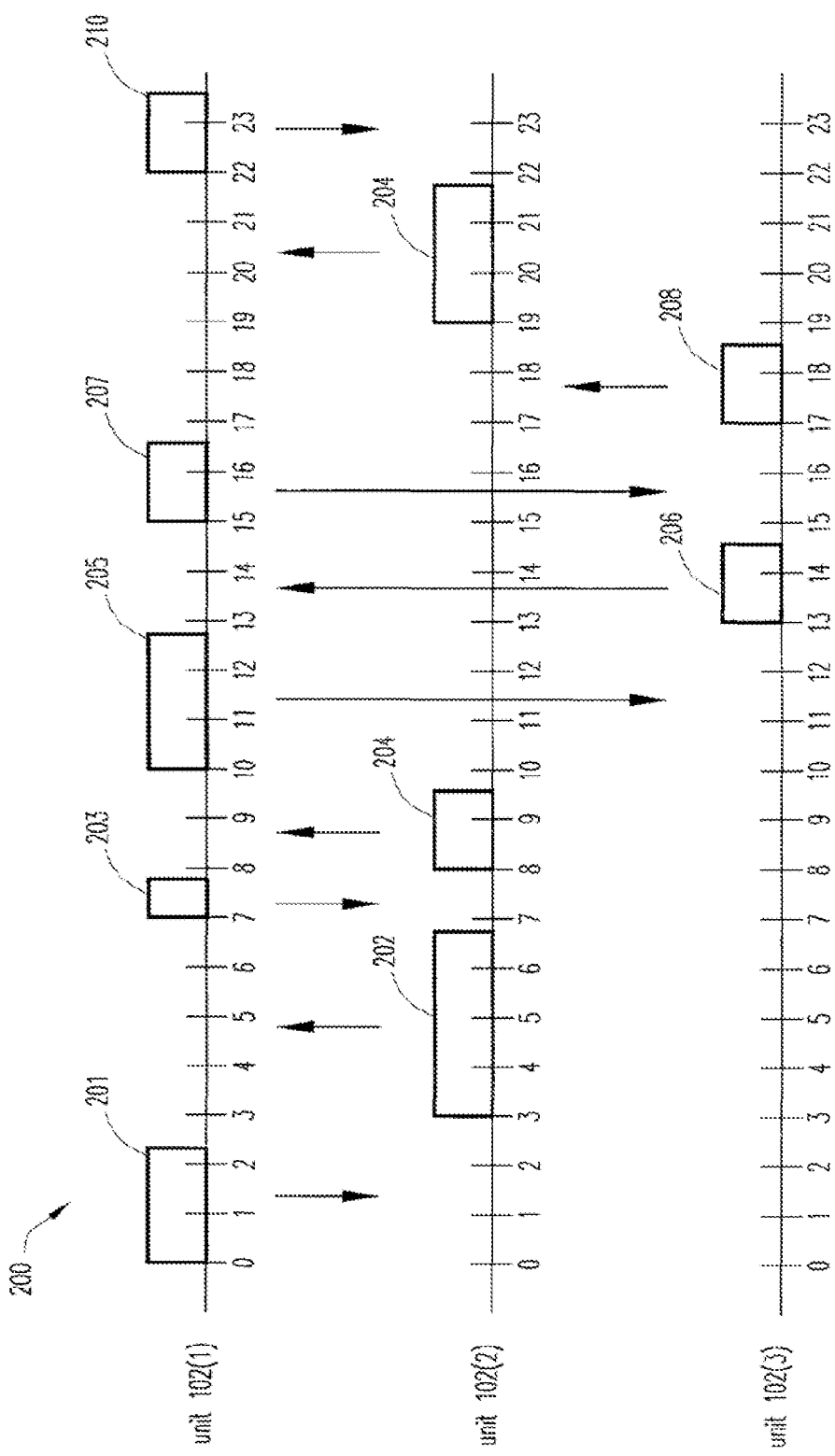
FIG. 2 illustrates the operation of a Ping-Pong protocol scheme.

Referring now to FIG. 2, there is an illustration of a Ping-Pong protocol used in the method of the present invention. A transmitted packet can be regarded as carrying a token. As the packet is received, the sending unit implicitly gives the token to the receiving unit, which enables the receiving unit to send a second packet. The unit with the token can then send a third packet to any other unit in the network. The Ping-Pong protocol enables a multiple access control (MAC) scheme. While the illustration of FIG. 2 and the subsequent figures in many cases illustrate a separate trace associated with a particular transmitting unit or service, it should be realized that this is merely for purposes of illustration, and the communications are occurring upon the same radio communications channel 25 having a number of time slots 30 defined therein.

FIG. 2, illustrates an exemplary operation of a token ping-pong scheme among three units in accordance with the present invention. A communication channel 200 permits communication among the unit 102(1), the unit 102(2), and unit 102(3). The channel 200 is divided into 24 time-division-duplex slots similar to those illustrated in FIG. 1. Packets 201-210 are shown being transmitted on the channel 200. As was illustrated in FIG. 1, transmission of packets begins at the boundary of a slot and can continue for a variable length of time.

The unit 102(1) begins transmission of the packet 201 at the boundary of the slot 0. The packet 201, which is being transmitted to the unit 102(2), occupies the entirety of the slot 0 and the slot 1 and part of the slot 2. Upon receipt of the packet 201, the unit 102(2) now has the token, and can transmit a packet beginning at the boundary of the slot 3. In practice you must allow for RF switching time, we assume the switching time to be zero. The unit 102(2) has a packet to transmit to the unit 102(1), so, at the boundary of the slot 3, the unit 102(2) begins to transmit to the unit 102(1) the packet 202. The packet 202 occupies the entirety of the slots 3-5 and part of the slot 6.

Following receipt of the packet 202, the unit 102(1) now has the token; therefore, at the boundary of the slot 7, the unit 102(1) can begin to transmit the packet 203, which is sent to the unit 102(2). The packet 203 occupies only part of the slot 7. The unit 102(2), which now has the token, can begin to transmit the packet 204 at the boundary of the slot 8. The packet 204 is transmitted to the unit 102(1) and occupies the entirety of the slot 8 and part of the slot 9.

Upon receipt of the packet 204, the unit 102(1) has the token and can begin transmission of the packet 205, which is transmitted to the unit 102(3) beginning at the boundary of the slot 10. The packet 205 occupies the entirety of the slots 10 and 11 and part of the slot 12. Following receipt of the packet 205, the unit 102(3) has the token. Therefore, the unit 102(3) can transmit the packet 206, which is transmitted to the unit 102(1), beginning at the boundary of the slot 13. The packet 206 occupies the entirety of the slot 13 and part of the slot 14. Therefore, the unit 102(1), upon receipt of the packet 206, can transmit a packet beginning at the boundary of the slot 15.

The unit 102(1) transmits the packet 207 to the unit 102(3) beginning at the boundary of the slot 15. The packet 207 occupies the entirety of the slot 15 and part of the slot 16. Upon receipt of the packet 207 by the unit 102(3), the unit 102(3) has the token and can transmit a packet beginning at the boundary of the slot 17. At the beginning of the slot 17, the unit 102(3) transmits the packet 208 to the unit 102(2). The packet 208 occupies the entirety of the slot 17 and a portion of the slot 18. Therefore, the unit 102(2) has the token and can begin transmitting a packet beginning at the boundary of the slot 19.

At the beginning of the slot 19, the unit 102(2) transmits to the unit 102(1) the packet 209. The packet 209 occupies the entirety of the slots 19 and 20 and part of the slot 21. Upon receipt of the packet 209, the unit 102(1) receives the token and can begin transmitting a packet at the boundary of the slot 22. The unit 102(1) begins transmitting the packet 210 at the boundary of the slot 22. The packet 210 occupies the entirety of the slot 22 and part of the slot 23. Upon receipt of the packet 210, the unit 102(2) has the token and can begin transmission of a packet at the boundary of the slot 24 (not shown).

Thus, FIG. 2 illustrates that, upon receipt of a packet, a unit receives the token and is permitted to transmit a packet to any other unit beginning at the boundary of the next slot following its receipt of a packet. Packets can be variable in length and thus can occupy a variable number of slots. The Ping-Pong protocol is more fully described in provisional application 60/226,965, filed Aug. 22, 2000; U.S. application Ser. No. 09/710,204, filed Nov. 9, 2000 which are incorporated herein by reference. The Ping-Pong protocol illustrated in FIG. 2 does not provide any guarantees in terms of granting access to the channel. In order to guarantee access to a channel, the token passing mechanism may be extended to provide unconditional access to the channel 200 at selected times.

Figure 3:
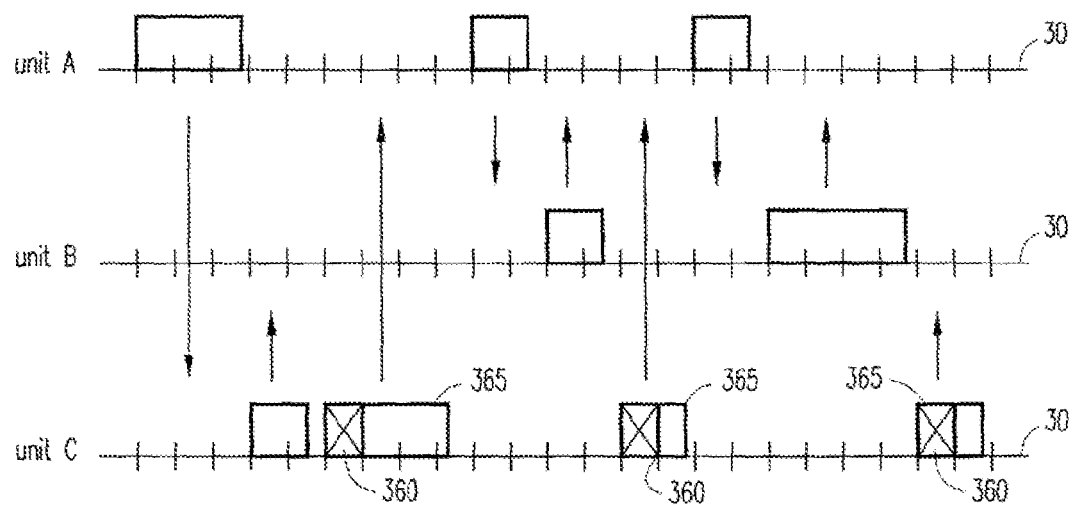
FIG. 3 illustrates a use of priority slots providing unconditional access to a radio channel within the Ping-Pong protocol.

Referring now to FIG. 3, there is illustrated a method for achieving unconditional access by using a priority slot 360. In FIG. 3, Unit C has a priority slot 360 at a fixed interval of eight time slots. At the priority slot 360, Unit C obtains an exclusive right to transmit data packets 365 on a channel. This occurs whether or not the token has actually been given to Unit C by previous packet reception from either Unit A or Unit B. The token is granted to Unit C based upon ownership of the priority slot 360 at a fixed point in time.

The Ping-Pong protocol and the priority slot 360 constitute a multiple access control (MAC) mechanism on the radio channel 200 that can be used to provide quality of service (QoS) to applications within personal devices 10. The goal in a QoS enabled environment is to enable predictable delivery for certain types of traffic, regardless of what other traffic is flowing through the network 5 at any given time.

From an application point of view, quality of services is characterized by placing requirements on one or more of the following parameters: bandwidth, comprising user information that needs to be transmitted, generally specified in kilo bits per second (kbit/s); and delay, comprising the time before which said user information must be delivered, generally specified in milliseconds (ins). In addition to the foregoing, requirements can be placed on peak bandwidth and retransmission bandwidth as well. The peak bandwidth specifies a maximum necessary resource reservation in case of variable bit rate streams. Retransmission bandwidth reservation specifies resource reservation necessary for dealing with transmission errors Four different traffic classes of applications have been defined in the 3GPP technical specification (3GPP TS23.107v3.3.0, "QoS Concept and Architecture," http://www/3gpp.org, June 2000):

1. Conversational class (e.g. voice)
2. Streaming class (e.g. streaming video)

3. Interactive class (e.g. web browsing)
4. Background class (e.g. background downloads of e-mail or files)

These are listed with the conversational class having the most stringent delay constraints and the background class having the loosest or no requirement for delay. Correspondingly, various QoS attributes are defined including maximum bit rate, maximum Service Data Unit (SDU) size, residual bit error ratio, etc. Traffic classes are not limited to the aforementioned. In fact, there is no unique way of classification that is followed by all standardization institutes. Broadly, however, one can define two fundamentally different types of services: one that is time critical and the other that is not (often referred to as best-effort service).

In communication terms, being able to meet the aforementioned QoS requirements translates into providing certain guarantees in terms of access to the communications channel 200 and providing specific radio protocol parameters. For a token based Ping-Pong protocol, where priority slots 360 provide the mechanism for regulating a guaranteed access to the channel 200, the relevant radio protocol parameters are priority slot interval, priority slot phase, modulation format and packet duration (dependent on the modulation format). These are assigned according to the above described QoS parameters.

Figure 4:
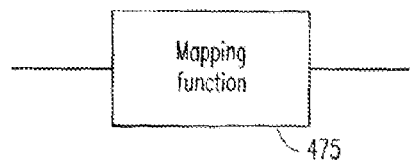
FIG. 4 is a block diagram of a mapping function according to the present invention.

Referring now to FIG. 4, there is provided a general block diagram of a mapping function 475 for implementing the system and method of the present invention within a personal device 10. The mapping function 475 has an input for receiving at least one of the QoS parameters including but not limited to the delay, maximum bit rate, maximum data unit size, and the average bit rate. The mapping will also take into account the usage of the channel by already established services.

The quality service parameters are mapped to various radio protocol parameters on a channel 200 including, but not limited to, at least one of the priority slot interval, the priority slot phase, the packet duration and the modulation scheme. Using the mapping function 475 the QoS parameters may be easily mapped to the radio protocol parameters of the channel 200.

The manner in which one or more QoS parameters are mapped to one or more radio protocol parameters by the mapping function 475 depends upon the type of service utilized and on the current use of the channel by other services. The mapping of said QoS parameters to these radio protocol parameters must occur for single services in isolation, for multiple services at the same time and for services requiring retransmission bandwidth.

Figure 5:
FIG. 5 illustrates the assignment of a priority slot interval for a single time critical service.

The mapping of quality of service requirements for a single time critical service to radio control parameters on the radio channel 200 using the mapping function 475 would occur in the following manner. The priority slot interval of a time critical service is derived from the required delay QoS parameter of the time critical service. The priority slots for a time critical service are assigned to occur on a periodic basis. The priority slots are spaced such that all data may be transmitted before expiration of the required delay as shown in FIG. 5. Thus, the priority slot interval must be smaller than the delay.

Figure 6A:
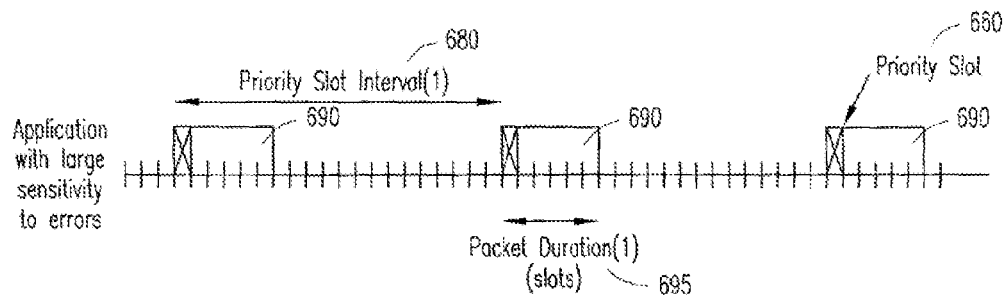
FIGS. 6a and 6b illustrate the use of differing modulation formats.
Figure 6B:
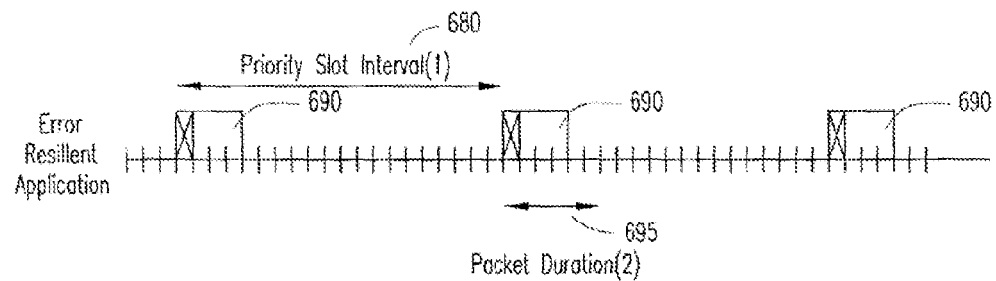

Sensitivity to transmission errors of time critical services may be combated by transmitting the packets carrying the user information in robust modulation formats. This comes at the expense of air interface time, as illustrated in FIGS. 6a and 6b. If an application exhibits error resilience, this can be exploited by transmitting the packets 690 using a dense modulation format (FIG. 6a) resulting in a shorter maximum packet duration 695. This consumes less power and allows multiplexing of more services on to the radio channel 200 between the packets 690. Thus, the error resistant application services illustrated in FIG. 6a provide more space for additional traffic than that illustrated in FIG. 6b, wherein a less dense modulation format is required due to the application's lack of error resilience. It is noted that the priority slot interval 680 is the same in each application, but additional spaces are available between packets 690 in FIG. 6a, due to the shorter packet duration 695 arising from the dense modulation format.

Figure 7:
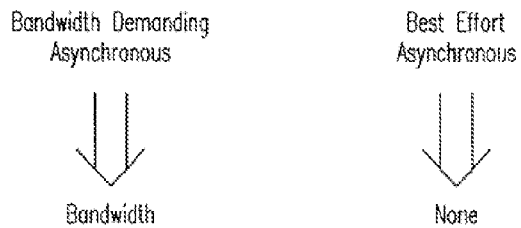
FIG. 7 illustrates the quality of service parameters associated with asynchronous services.

Non time critical applications allow a greater flexibility in scheduling traffic. Non time critical services can be of two types, as illustrated in FIG. 7, having different QoS requirements, bandwidth demanding or best effort. Bandwidth demanding services usually require only a single quality of service parameter, namely average bandwidth expressed in bits/s. Since there is no particular periodicity in which the message must be generated, or a particular time limit before which the message must be delivered on a microscopic level, there is no notion of a frame rate or maximum packet duration. Within this time frame, it is not important at exactly which time access occurs. But on average, within such a time frame, the bandwidth should be attained. So this means that the bandwidth demanding services have no strict delay requirements in a microscopic sense, but they do have some requirements in a macroscopic sense.

The maximum packet duration is only limited by the maximum packet duration allowed on the radio channel 200. Demands posed by bandwidth demanding services can also be met using priority slots. While priority slots offer the right to transmit, they also interrupt traffic. Since services of this nature are not time critical, co-existence with other services will be enhanced by allocating longer packets. This allows the priority slots interval to be larger and minimizes overhead.

Best effort services have no formal quality of service demands. However, these services rely on the "best effort" aspect of the protocol to get access to a channel. Typically, the packets may be sent using a dense modulation format in order to minimize the air-time occupancy. While such transmissions are most vulnerable to errors, multiple retransmissions may be performed. Typically, no priority slots are reserved to support this service. Due to the best effort nature of the required quality of service, time is not a critical factor.

Figure 8A:
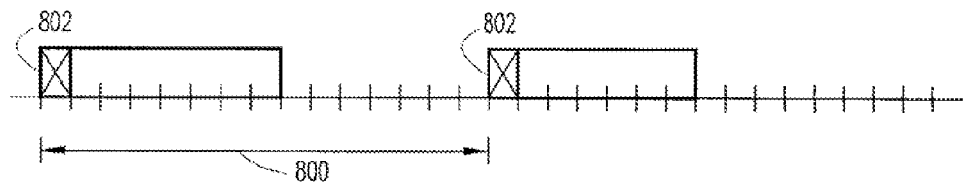
FIGS. 8a and 8b illustrate the mapping of services requiring retransmission bandwidth.
Figure 8B:
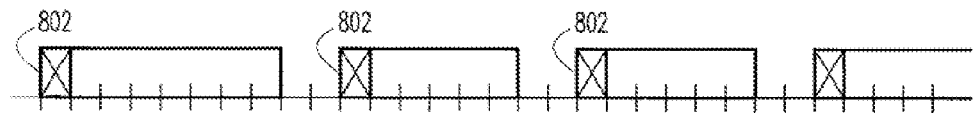

The retransmission bandwidth of non time critical but bandwidth demanding services may require either the soft guarantee or a hard guarantee of data transmission as shown in FIGS. 8a and 8b. If a soft guarantee is utilized (FIG. 8a), capacity momentarily not used on the channel, can be deployed for retransmissions. With soft guarantees, no guaranteed channel access for retransmissions is provided. The priority interval 800 between the assigned priority slots 802 can be maximized as it only considers the average bandwidth required assuming no errors.

Retransmission bandwidth may also be assured by hard guarantees (FIG. 8b). Hard guarantees assign more priority slots 802 to a particular service in order to guarantee access to the channel for any necessary retransmissions. By signing more priority timeslots 802 to a particular application, the application has more guaranteed opportunities to retransmit packets that may not have been correctly received. However, by using the hard guarantee format system, system throughput is affected since more channel resources are utilized by a single application. The situation may also arise when an application gains control via a priority slot but no retransmission of information is necessary. Thus, a certain amount of time is required to determine that no retransmission is necessary and to release the priority slot to a next application.

Based upon the foregoing descriptions and with respect to the mapping of time critical and non time critical services to radio parameters, we will now consider transmitting multiple services simultaneously upon a single radio channel. It should be understood that the number of time slots illustrated within the priority intervals and slot durations are illustrative only and as a practical case there will be obtained many more slots within the intervals. In general, multiple services demanding guaranteed access to the channel are supported by staggering the priority slot intervals assigned to a particular service. This is achieved by choosing different phases (starting reference points) for the train of priority slots belonging to services.

Figure 9:
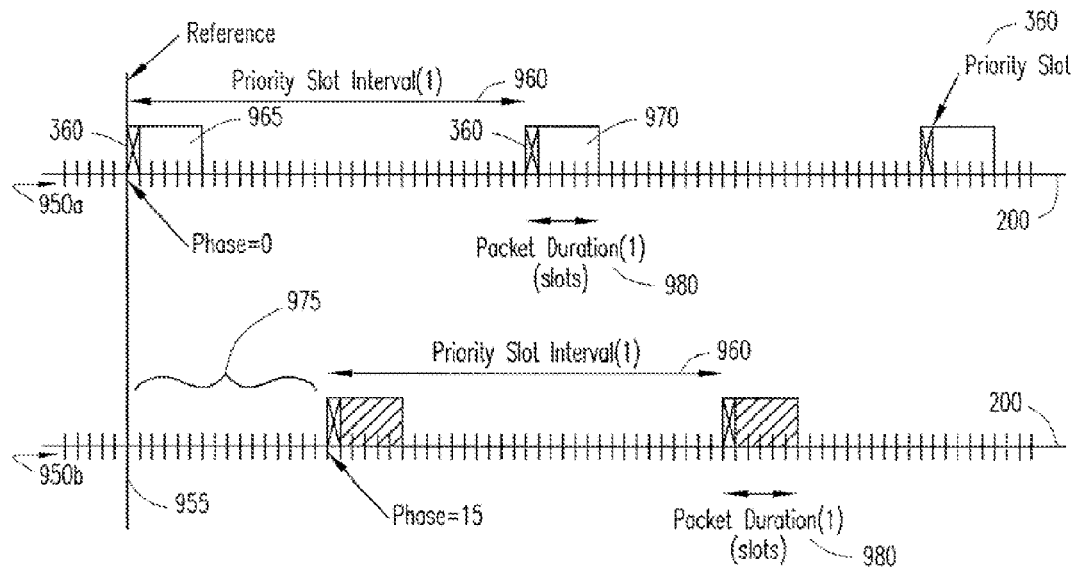
FIG. 9 illustrates the staggering of two isochronous services with identical quality of service requirements sharing a same channel.

Referring now to FIG. 9, there are illustrated two time critical services 950 with identical quality of service requirements that are sharing a same radio channel 200. While a separate trace is shown for each time critical service 950, it should be understood that these services are provided upon a same radio channel 200. The services may comprise any type of time critical service. For simplicity, the destination units are not shown in FIG. 9 or the subsequent figures. With respect to a reference point 955, the first time critical service 950A gets a priority slot interval 960 with priority slot phase $\phi=0$. The priority slot phase comprises the offset from between the priority slots of the time critical service and the reference point 955. The reference point 955 is a common point in time in which all services participating on this radio channel 200 are aware and use for a common reference point and may be at any location. As can be seen in FIG. 9, time critical service 950A begins transmitting the data packet 965 at reference point 955 and begins transmitting a next data packet 970 after expiration of the priority slot interval 960.

The second time critical service 950B has a same priority slot interval 960 and obtains access to the radio channel 200 at a phase offset (different phase) 975 from the reference point 955. In this illustration, the phase 975 for the second time critical service 950B is equal to half of the priority slot interval 960 of the first service 950A. However, another phase offset 975 could also have been chosen. The lower bound on the phase 975, i.e., the density of staggering, is set by the maximum packet duration 980.

Figure 10:
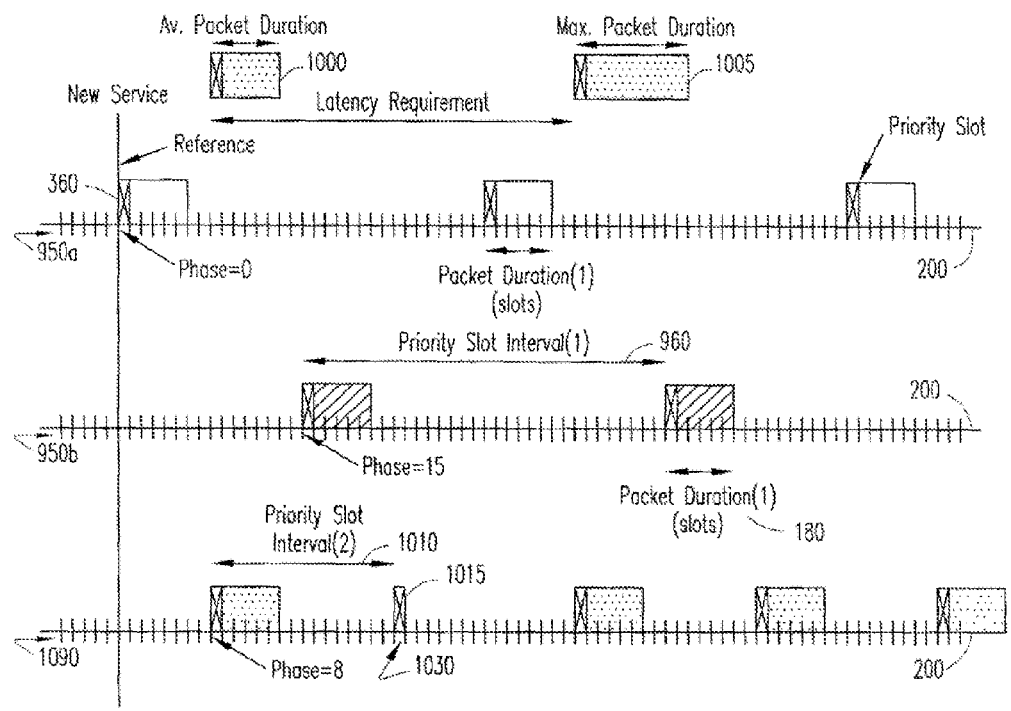
FIG. 10 illustrates the mapping of radio protocol parameters for synchronous and isochronous services sharing a same channel.

Time critical services can also co-exist by staggering priority slots as illustrated in FIG. 10. FIG. 10 illustrates a hypothetical scenario wherein a new time critical service 1090 with certain quality of service requirements is to be admitted in the midst of the time critical services 950 discussed with respect to FIG. 9. In this case, the delay requirements of all of the three services are identical. The maximum packet duration 1005 is indicated in the top row. The solution in this case is to plan a shorter priority slot interval 1010 for the time critical service 1090 that can fit in between the priority slot interval 960 of the two time critical services 950. The bottom trace shows one possible mapping scenario for the time critical service 1090. In order to guarantee that the longest message gets through, the priority slots 1015 are assigned in such a way that if the largest packet is split in two there is enough room to fit the longest message in between the two time critical services packets of the radio channel 200. Because the message length of some services may be variable and messages will be split up, the resulting priority slot allocation will occasionally result in unused priority slots as shown at 1030. At 1030, priority slot 1015 has obtained control of the radio channel 200, but no data is available to be transmitted. In this case, the service passes control to another service.

Figure 11:
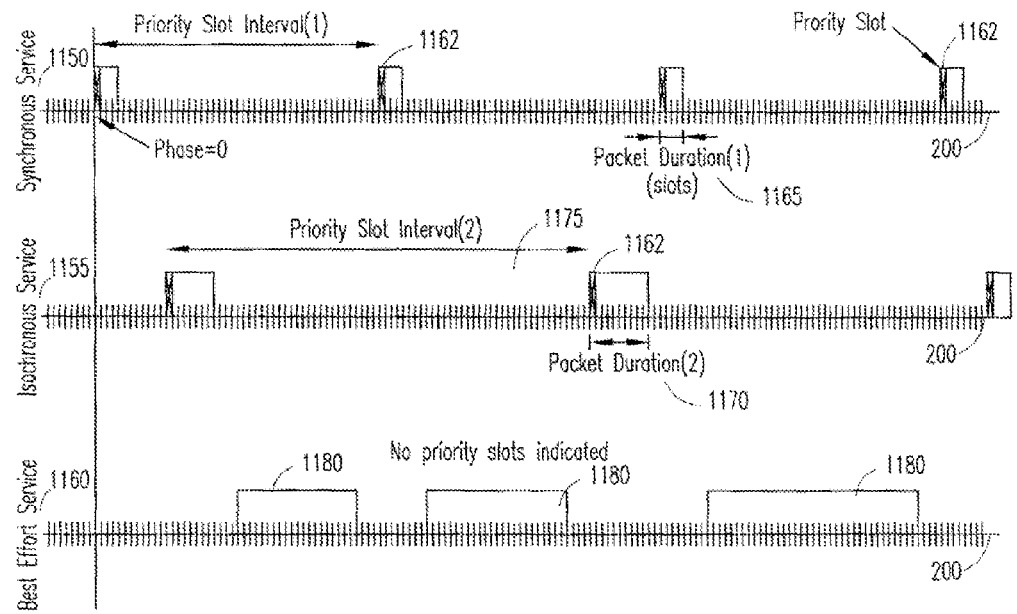
FIG. 11 illustrates the sharing of a channel between synchronous services, isochronous services and best effort services.

So far, the multiplexing of time critical services has been described. The multiplexing is accomplished by proper assignment and positioning of priority slots. Now the inclusion of non time critical services will be considered. Since priority slots provide unconditional access to a channel 200, they inherently cause an interruption of traffic. Interruption of time-critical traffic by non time critical services is not desirable. Accordingly, non time critical traffic should preferable not be controlled by assigning priority slots. Best effort traffic can be carried out using the ping pong mechanism between the time-critical traffic. Referring now to FIG. 11, there are illustrated three different services sharing the same radio channel 25. The services include a first time critical service 1150, an a second time critical service 1155 and a best effort non time critical service 1160. Priority slots 1162 and packet duration 1165 of a first time critical service 1150 are shown in the top trace 1150a. The second trace 1150b illustrates the priority slot interval 1175 and the variable packet duration 1170 of the second time critical service 1155. The periods in between the time-critical transmissions can be used for supporting the best effort service 1160. Thus, it can be seen that each packet 1180 of the best effort service 1160 is included in the openings between the packets of the time critical services 1155 and 1150. The best effort service 1160 relies on a fair token distribution policy in order to gain access to the channel 2000 and, thus, no priority slots are allocated.

Figure 12:
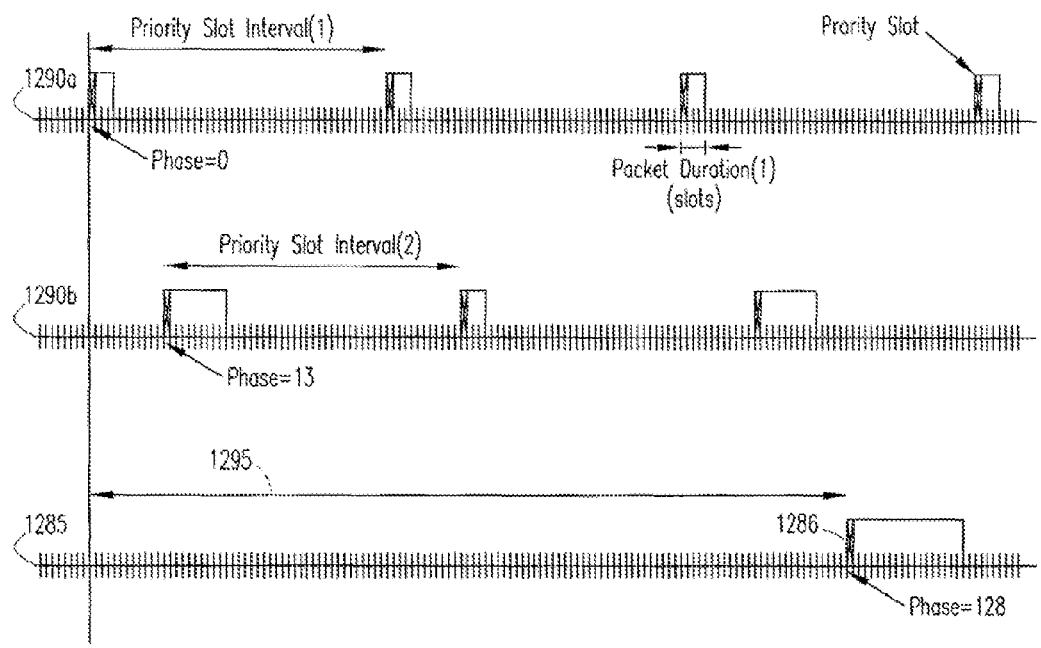
FIG. 12 illustrates the sharing of a same radio channel by time-critical and asynchronous services.

Referring now to FIG. 12, non time critical services requiring bandwidth guarantees may use priority slots 1286. Since delay is not an issue, the concept of delivering frames of bits before a certain time is not an issue. However, in order to minimize overhead, and cause minimum interruptions, user information should be transmitted in larger contiguous blocks. The largest available block will generally be determined by appearance of the next priority slot (probably belonging to the time critical service that has the smallest delay requirements). The third trace of FIG. 12 illustrates a non-time-critical bandwidth demanding service 1285. A much larger priority slot interval is used as compared to the time critical services 1290. The size of the priority slot interval 1295 is dependent upon the bandwidth requirement and maximum packet size.

Figure 13:
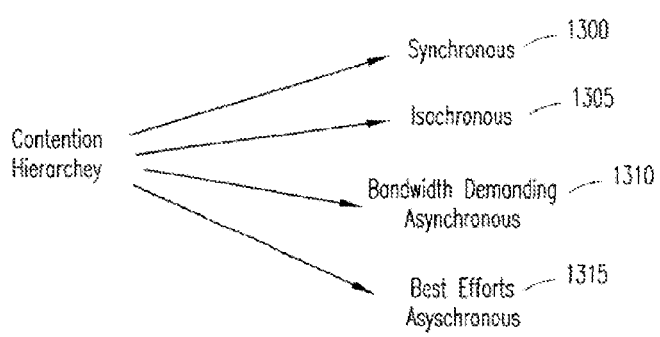
FIG. 13 illustrates contention problems on a radio channel.

The priority slot intervals of the time critical services will be different as illustrated in FIGS. 9-12. Such a situation inevitably will lead to a contention problem wherein a priority slot of another service will either occur while a packet transmission of the previous service is still in progress, or may occur at the same time of another priority slot. Contention problems can be resolved by allowing higher priority traffic to take precedence. Thus, in FIG. 13 the synchronous traffic 300 takes precedence over the isochronous traffic 305, which takes precedence over the bandwidth demanding asynchronous 310 which will take precedence over a best effort asynchronous traffic. In the case of contention between packets of equal traffic types, the contention must be resolved by granting the right to the owner of the leading priority slot. A simple scheme might embody giving up the right to transmit in the case of contention. If the priority slots coincide exactly, the contention may be resolved by giving the service originating from the lowest address to take precedence.

Within the above-described system, required bandwidths can be provided by using a combination of maximum packet duration and the priority slot interval. In order to support multiple services, the priority slots belonging to different services must be staggered. The priority slot phase can be used to achieve this staggering. Additionally, if there are requirements on the delay, the priority slot interval along with the phase can be chosen in such a way as to meet these delay requirements. The delay places an upper bound on the priority slot interval. Loss tolerance provided by the application can be exploited by transmitting packets using a dense modulation format, which can under clean channel conditions allow admission of more services while allowing vulnerable packets to be transmitted in more robust formats. Either the packet duration, or the priority slot interval can be negotiated in such a way that a certain level of retransmission can be guaranteed for packets originating from applications that are sensitive to errors. For multiple services using the same channel, the overall mapping has to take into account the QoS requirements of each individual service. If an additional, new service is deployed, the current mapping of the existing services may have to be altered in order to accommodate the new service. If one or more QoS requirements are endangered by the new service, the new service may be denied (admission control) or it may have to relax its QoS requirements.

The previous description is of a preferred embodiment for implementing the invention, and the scope of the invention should not necessarily be limited by this description. The scope of the present invention is instead defined by the following claims.

What is claimed is:

1. A method for transmitting, by a communications unit, packets of a service having quality of service (QoS) requirements, comprising the steps of
   receiving QoS parameters associated with a service including at least one of delay, maximum bit rate, maximum data unit size and average bit rate,
   mapping the QoS parameters to radio protocol parameters including at least one of a priority slot interval, a priority slot phase, a packet duration and modulation format for a radio channel; and
   transmitting the packets on the radio channel according to the mapped radio protocol parameters.

2. The method of claim 1, wherein the step of mapping further comprises the steps of deriving the priority slot interval for a time critical service from the delay of the time critical service.

3. The method of claim 2, wherein the step of mapping further includes the step of setting the priority slot interval of the time critical service less than the delay.

4. The method of claim 1, wherein the step of mapping further includes the step of modulating the packets responsive to an error resilience of an associated application.

5. The method of claim 4, wherein the step of modulating further includes the step of modulating the packets from error resilient applications using a dense modulation format.

6. The method of claim 1, wherein the step of mapping further comprises the steps of setting a priority slot interval smaller than a required delay and larger than a maximum packet duration.

7. The method of claim 1, wherein the step of transmitting further comprises the step of including within at least one packet of the packets a priority timeslot providing an application associated with the packet exclusive control of the radio channel.

8. The method of claim 1, wherein the step of mapping further comprises the step of staggering priority slots of at least two time critical applications to prevent transmissions at a same time.

9. The method of claim 8, wherein the step of staggering further comprises the step of determining a priority slot phase for at least one time critical application.

10. The method of claim 8, wherein the step of staggering, further comprises the step of establishing a first priority slot phase associated with a first application that falls within a second priority slot interval associated with a second application wherein transmission of the packets of the first and second application substantially occur in different timeslots of the radio channel.

11. The method of claim 1, wherein the step of mapping further comprises the step of establishing a priority slot interval of a first application having sufficient space to receive a first portion of a largest packet associated with a second application in a first interval and a remaining portion of the largest packet associated with the second application in a second interval.

12. The method of claim 1, wherein the step of transmitting further comprises the step of transmitting packets associated with a non time critical application between transmission of packets of time critical applications.

13. The method of claim 1, wherein the step of transmitting further comprises the steps of
   detecting a contention between two packets attempting to control a radio channel at a same time,
   determining an application associated with the packet, and
   providing access to the radio channel to the packet associated with the application having a higher priority.

14. The method of claim 1, wherein the step of mapping further comprises the step of establishing a priority slot interval enabling retransmission of packets within a single priority slot interval.

15. The method of claim 1, wherein the step of mapping further comprises the step of establishing a priority slot interval that provides multiple priority slots for retransmission.

16. A method for transmitting, by a communications unit, packets having quality of service (QoS) requirements, comprising the steps of:
   receiving QoS parameters associated with a service including at least one of delay, maximum bit rate, maximum data unit size and average bit rate,
   mapping the QoS parameters to radio protocol parameters including at least one of a priority slot interval, a priority slot phase, a packet duration and modulation format for a radio channel;
   establishing a priority slot for at east a portion of the packets of the plurality of packets, said priority slot providing exclusive control of the radio channel to an associated application; and
   transmitting the packets on the radio channel according to the mapped radio protocol parameters.

17. The method of claim 16, wherein the step of mapping further comprises the steps of deter mining a priority slot interval and an offset to meet a quality of service delay requirement.

18. The method of claim 16, wherein the step of mapping further comprises the steps of deriving the priority slot interval for a time critical service from the delay of the time critical service.

19. The method of claim 16, wherein the step of mapping, further comprises the step of staggering priority slots of at least two time critical applications to prevent transmissions at a same time.

20. The method of claim 19, wherein the step of staggering further comprises the step of establishing a priority slot phase of a first application having sufficient space to receive a first portion of a largest packet associated with a second application in a first interval and a remaining portion of the largest packet associated with the second application in a second interval.

21. The method of claim 16, wherein the step of transmitting further comprises the step of transmitting first packets associated with a non time critical application between transmission of packets of time critical applications.

22. The method of claim 16, wherein the step of mapping further comprises the step of establishing a priority slot interval enabling retransmission of packets within a single priority slot interval.

23. The method of claim 16, wherein the step of mapping further comprises the step of establishing a priority slot interval that provides multiple priority slots for retransmission.

24. An apparatus for mapping quality of service (QoS) parameters of an application to radio control parameters of a radio channel in a personal device, comprising:
   an input for receiving QoS parameters associated with a service including at least one of delay, maximum bit rate, maximum data unit size and average bit rate; and
   device for mapping the QoS parameters for a radio channel to radio protocol parameters including at least one of a priority slot interval, a priority slot phase, a packet duration and modulation format, and transmitting packets having the QoS requirements on the radio channel according to the mapped radio protocol parameters.

25. The apparatus of claim 24, wherein the device further derives the priority slot interval for a time critical service from the delay of the time critical service.

26. The apparatus of claim 25, wherein the device further derives the priority slot interval of the time critical service less than to the delay.

27. The apparatus of claim 24, wherein the device further modulates the packets responsive to an error resilience of an associated application.

28. The apparatus of claim 24, wherein the device further sets a priority slot interval smaller than a required delay and larger than a maximum packet duration.

29. The apparatus of claim 24, wherein the device further includes within at least one packet of the packets a priority timeslot providing an application associated with the packet exclusive control of the radio channel.

30. The apparatus of claim 24, wherein the device staggers priority slots time critical applications of at least two to prevent transmissions at a same time.

31. The apparatus of claim 26, wherein the device further establishes a first priority slot interval associated with a first application that falls within a second priority slot phase associated with a second application wherein transmission of the packets of the first and second application substantially occur in different timeslots of the radio channel.

32. The apparatus of claim 24, wherein the device further establishes a priority slot interval of a first application having sufficient space to receive a first portion of a largest packet associated with a second application in a first interval and a remaining portion of the largest packet associated with the second application in a second interval.

33. The apparatus of claim 24, wherein the device further transmits first packets associated with a non time critical application between transmission of packets of time critical applications.

34. The apparatus of claim 24, wherein the device further detects a contention between two packets attempting to control a radio channel at a same time, determines an application associated with the packet, and provides access to the radio channel to the packet associated with the application having a higher priority.

* * * * *

UNITED STATES PATENT AND TRADEMARK OFFICE
CERTIFICATE OF CORRECTION

| | | |
|---|---|---|
| PATENT NO. | : 8,565,257 B2 | Page 1 of 1 |
| APPLICATION NO. | : 12/847517 | |
| DATED | : October 22, 2013 | |
| INVENTOR(S) | : Haartsen et al. | |

It is certified that error appears in the above-identified patent and that said Letters Patent is hereby corrected as shown below:

In the Specification

In Column 1, Line 13, delete "entire," and insert -- entire --, therefor.

In Column 4, Line 55, delete "(ins)." and insert -- (ms). --, therefor.

In Column 4, Line 61, delete "errors" and insert -- errors. --, therefor.

In Column 4, Lines 64-65, delete "http://www/3gpp.org," and insert -- http://www.3gpp.org, --, therefor.

In the Claims

In Column 9, Line 25, in Claim 1, delete "steps of" and insert -- steps of: --, therefor.

In Column 10, Line 16, in Claim 13, delete "steps of" and insert -- steps of: --, therefor.

In Column 10, Line 39, in Claim 16, delete "at east" and insert -- at least --, therefor.

In Column 10, Line 46, in Claim 17, delete "deter mining" and insert -- determining --, therefor.

In Column 10, Line 53, in Claim 19, delete "mapping," and insert -- mapping --, therefor.

Signed and Sealed this
Eleventh Day of November, 2014

Michelle K. Lee
*Deputy Director of the United States Patent and Trademark Office*